Oct. 1, 1963 M. S. CZARNOWSKI 3,105,535
INSERT FASTENER
Filed Aug. 4, 1960
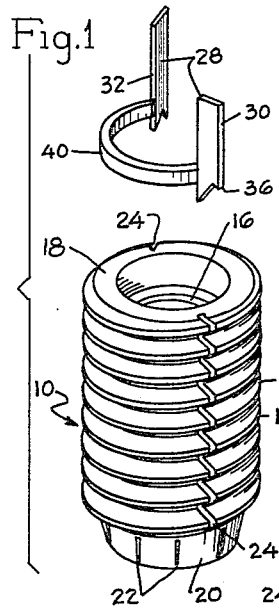
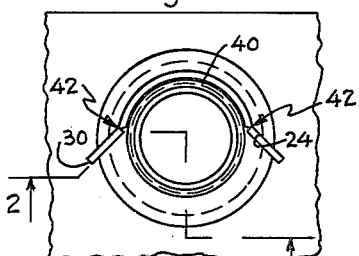
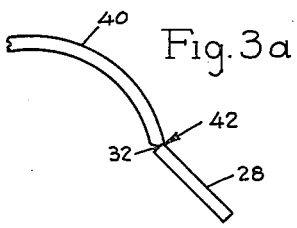
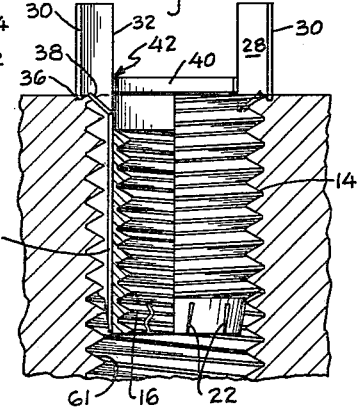
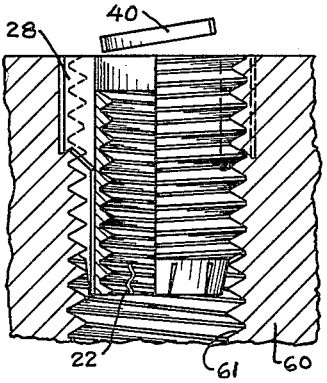
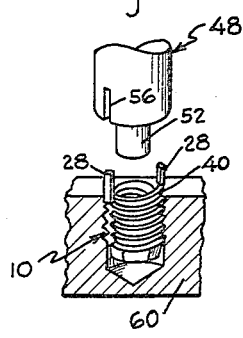
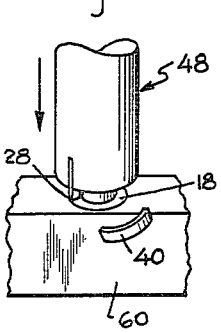
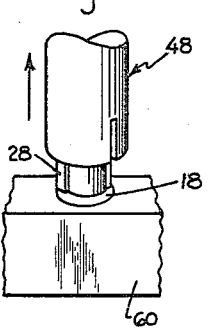
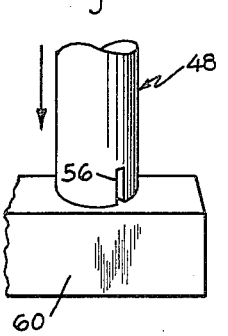
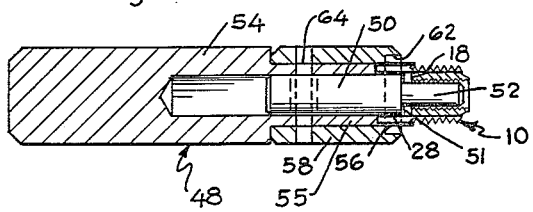
INVENTOR.
Melvin S. Czarnowski
BY
Jack R. Halvorsen
ATT'Y.

United States Patent Office 3,105,535
Patented Oct. 1, 1963

3,105,535
INSERT FASTENER
Melvin S. Czarnowski, Torrance, Calif., assignor to Illinois Tool Works, Inc., Chicago, Ill., a corporation of Delaware
Filed Aug. 4, 1960, Ser. No. 46,653
1 Claim. (Cl. 151—23)

This invention relates to an improved insert. More particularly, it relates to a threaded insert for acceptance within the threaded bore of a workpiece. It is further adapted to accept a male threaded fastener within its internally threaded bore. The invention further relates to a novel locking means between the workpiece and the insert.

The use of internally and externally threaded inserts in threaded bores of workpieces is generally old in the art. They have found great acceptance in areas where the workpiece material is of such a nature as to limit the tensile strengths permissive between a fastener and the workpiece. Difficulties have been encountered in such fasteners, primarily, in the locking members associated therewith which interconnect the fastener and workpiece. Such members generally upset workpiece material for the prevention of retrograde rotation between the insert and workpiece. Inserts of this type employ longitudinally extending broaching keys. Difficulties have arisen in the preassembly of such keys with the insert, and because of their initially delicate nature have resulted in their loss in inventory storage through disassembly from the insert.

It is an object of this invention to provide an improved threaded insert for fastening a male threaded member in relation to a workpiece.

Another object of this invention is to provide an improved locked insert wherein the locking means can be securely preassembled with the insert.

It is a further object of the invention to provide a locking insert having longitudinally extending key-ways for accepting locking keys which are preassembled thereto and which can be utilized as the driving means for the insert. It is still another object of this invention to provide an improved insert tool for use with inserts of the type described hereinabove.

Further objects will become apparent when the specification is read in conjunction with the accompanying drawing wherein:

FIG. 1 is an exploded perspective view of the elements of an embodiment of this invention;

FIG. 2 is an elevation in partial section showing the embodiment of this invention with the locking means preassembled thereto, said insert being shown in its inserted position within a workpiece as taken along line 2—2 of FIG. 3;

FIG. 3 is a plan view of the device shown in FIG. 2;

FIG. 3a is an enlarged view of the connection between a locking key and the frangible connector;

FIG. 4 is an elevation in partial section of the embodiment shown in FIG. 2 with the keys driven home and severed from the frangible connector;

FIGS. 5 through 8 illustrate the operation of an insert tool utilized in seating the insert of this invention within a workpiece and FIG. 9 is a partial sectional view of a tool of the type utilized in FIGS. 5 through 8.

Referring now to the drawings, and more particularly FIGS. 1 through 4, the insert 10 contemplated by this invention includes a tubular body 12 which is cylindrical in nature and provided with both external threads 14 and internal threads 16. The upper end 18 of the insert is substantially flat and perpendicular to the axis of the body 12. The lower or entering end 20 of the body may be tapered and unthreaded, if desired, to facilitate entry of the insert within a threaded workpiece. In the present instance, the entering end 20 is semi-resilient and is slotted or bifurcated as at 22 at a plurality of positions about its circumference and thence circumferentially constricted so as to reduce the internal diameter of the threads 16 at the lower end. This provides a prevailing torque on male fasteners adapted to be accepted by internal threads 16 which are screwed into this area.

Extending longitudinally along the outer threaded wall 16 in a plurality of positions are slots 24, in the present instance there being two in number located in opposite walls and opening outwardly away from one another. As best seen in FIG. 3 slots 24 are non-radially disposed relative to the body 12, for purposes best set forth hereinafter. Slots 24 when viewed in section as in FIGS. 2 and 4 penetrate the outer wall of the fastener through the entire depth of thread 14 and terminate short of the root of internal root 16.

In the present instance the locking means utilized with the insert 10 are a plurality of rectangular shaped keys 28. Keys 28 have a thickness such as to be acceptable and complementary to the slots 24 and may, if desired, have a width greater than the depth of slot 24 so that the outer edge 30 projects substantially beyond the major diameter of external thread 14 when the inner edge 32 is seated in the bottom of key-way or slot 24. This feature is not absolutely essential. If the insert is to be used in extremely soft materials, such as plastic or wood, the feature of the key extending beyond the major diameter of the insert is beneficial as it would materially increase the insert's resistance to "torque-out" loads. In aluminum, or harder workpiece materials, this additional projecting width is not required on the keys as the workpiece material has more inherent strength and thereby higher resistance to strip-out torques. When the keys 28 are driven into slots 24 of the insert, after the insert is installed in a workpiece 60, the keys 28 produce a broaching action down through the threads of the tapped hole 61 in the workpiece providing the desired mechanical lock between the insert and the workpiece. Referring back to the width of keys 28, it can be seen that the width of the keys is an important factor in the amount of driving force required to install them. If the required driving force is too great the keys can fail in column action. Thus, the width of the keys is substantially determined by the type of workpiece material. It should be noted that for soft materials, besides increasing the width of the keys, it is often desirable to provide more than two keys of the type disclosed.

The entering end of keys 28, to assist the broaching action, are notched as at 38 and extend upwardly and outwardly from the end of the edge 32 adjoining the innermost portion of slot 24 for a substantial distance and thence project downwardly and outwardly to a sharp point 36 at the juncture with the outer edge 30.

Interconnecting keys 28 is the resilient, arcuate, spring like web 40. Web 40 is connected to each of the keys by a frangible joint at their inner edge 32 as indicated at point 42. This connection at point 42 is made in spaced relation to the entering end of the key 28 so that the keys 28 can be preassembled within the slots 24 for a short distance longitudinally thereof, as best seen in FIG. 2 with the web 40 resting atop the flat upper end 18. It has been found desirable to make the diameter of web 40 slightly less, initially, at its outer ends than the corresponding chordal distance between the innermost portions of slots 24. This provides a clamping effect on the keys 28 and assists in retaining them in preassembled relation. The frangible connection at point 42 has sufficient strength to retain the keys 28 in preassembled relation to the body 12 but can be severed by application of a force along the axis of the keys 28.

In the installation of this insert, a tool of the type generally shown in FIG. 9 can be utilized. It is provided with a pilot 50 having a reduced end 52 acceptable within the inner threaded bore 16 of fastener 10. Telescopically associated with and encircling pilot 50 is a mandrel or ram 54 having a reduced portion 55 provided with a central bore adapted to coaxially accept pilot 50. The walls surrounding said bore are bifurcated by a plurality of axially extending slots 56. Slots 56 are of such size as to radially accept the keys 28 as they project from the insert 10 but have a limited axial extent, less than the total projecting length of the keys 28 as measured from their preassembled condition in insert 10, for purposes best set forth hereinafter. A retaining ring 58 having a through bore and a counterbore 62 at one end encircles and is telescopically associated with the pilot and mandrel. The counterbore 62 is positioned adjacent the reduced end portion 52 and is suitable for encircling the keys and the web 40 so as to provide lateral support therefor. The pilot 50, ram 54, and ring 58 each have through bores which are transverse to their mutual axes which, when in registry, will accept a pin 64 for retaining the elements as a single unit.

Referring now to FIGS. 5 through 8, wherein the retaining ring 58 has been removed from the tool 48 for purposes of clarity in illustration, the insert 10 can be threaded by hand into the workpiece 60, as shown in partial section in FIG. 5. In the alternative, and not illustrated, the tool 48 with its reduced pilot portion 52 disposed within internal threads 16 and with keys 28 located within slots 56 and encircled by ring 58 can be used as the rotary driving tool. Rotary forces are then transmitted through the keys as acted on by the tool to rotate the insert in the threaded workpiece. Referring now to FIG. 6, the application of an axial force in the direction of the arrow to the tool 48, while the keys 28 are disposed within slots 56, results in the severing of keys 28 from web 40 and the dissociation of web 40 from the assembly. It can be seen, by referring to FIG. 9, that the axial relationship of the tool parts to the insert is such that the shoulder 51 formed by the reduced end 52 is axially spaced from the end 18 of the insert 10 a distance slightly greater than the axial length of web 40. The pilot 50 is smaller in diameter than the web 40 and hence will move downwardly internally of web 40 until it bottoms on the upper end 18. Although the ring 58 has been removed from the tool 48 in FIGS. 5 through 8 for purposes of clarity, it is to be understood that the web 40 is retained within the counterbore 60 until the tool is moved axially in the direction of the arrow in FIG. 7. To further drive the keys it is necessary for the tool to be moved axially upwardly, again as shown in the direction of the arrow in FIG. 7, and rotated so as to present a solid portion of the mandrel 54 to the upper ends of keys 28 since axial pressure on keys 28 cannot be continued while they remain in the slots, after severing the web 40, since as indicated previously, the shoulder 51 will bottom on the top 18 and the bottom edge of ring 58 would bottom on the workpiece. A further axial application of force in the direction of the arrow shown in FIG. 8 results in the keys being driven longitudinally until their upper or driving end is flush with the upper surface of workpiece 60 and the upper end 18 of insert 10. The finally installed position of the locked insert can best be seen in the partial section of FIG. 4.

In the installed position, the keys 28 have broached their way through the workpiece 60 beyond the root diameter of the threads in the workpiece bore. The angular disposition of keys 28 insures a positive lock for preventing retrograde rotary motion of the insert in either direction.

It should be recognized that the installation tool 48 can take other forms than the one shown in FIG. 9. For example, the reduced end 52 of the pilot may be threaded, not shown, so as to be complementary to and acceptable by internal threads 16 of the insert. In that instance the pilot 50 would have to be accessible at its upper end for wrenching and mandrel ram 54 would have to be axially and rotatably movable relative to pilot 50 so as to accommodate keys 28 in slots 56.

Thus, it is felt that I have disclosed an improved threaded insert which is ideally adapted for preassembly with its locking means and which has a minimium number of parts of a simple nature which can be economically fabricated and quickly installed.

While only one embodiment of this invention has been disclosed, it is felt that other embodiments will become apparent to those skilled in the art and it is my intent that I be limited only by the appended claim.

I claim:

A long insert assembly adapted to be used in a workpiece having a threaded bore, and comprising a tubular body portion having external threads complementary to the threaded bore and a through bore extending throughout the length of the body portion and internally threaded, a plurality of longitudinally extending slots which extend to both ends of the body portion and which open outwardly and intersect said external threads throughout the length of the said slots, said slots being inclined relative to a radius of said threaded bore and being disposed in converging relationship, a plurality of keys, an arcuate spring-like strap having an interconnection adjacent one end of each key to provide free end portions with the end portion at said one end of each key adapted to be accepted within a corresponding longitudinally extending slot to preassemble the keys to one end of the insert by engagement of the end portions within the slots, said interconnection being of a reduced cross sectional area relative to said strap to provide a frangible interconnection and said one end of each key being inclined upwardly and outwardly from the inner edge of said key and then downwardly and outwardly to provide a notch and a sharp point whereby said keys are adapted to broach through the material forming the threads in the workpiece bore when the insert is seated in the bore and the keys are axially moved through the slots whereby the insert is prevented from rotating relative to the workpiece.

References Cited in the file of this patent

UNITED STATES PATENTS

| | | |
|---|---|---|
| 707,102 | Graham | Aug. 19, 1902 |
| 1,598,714 | Gray | Sept. 7, 1926 |
| 2,005,585 | Thorin | June 18, 1935 |
| 2,381,747 | Howe | Aug. 7, 1945 |
| 2,675,607 | Catlin | Apr. 20, 1954 |
| 2,855,970 | Neuschotz | Oct. 14, 1958 |
| 2,858,601 | Cummaro | Nov. 4, 1958 |
| 2,877,817 | Rockwell | Mar. 17, 1959 |
| 2,958,358 | Neuschotz | Nov. 1, 1960 |

FOREIGN PATENTS

| | | |
|---|---|---|
| 10,413 of 1897 | Great Britain | Apr. 27, 1897 |